United States Patent
Omatsu (10) Patent No.: US 8,082,191 B2
(45) Date of Patent: Dec. 20, 2011

(54) EGG CODE MANAGEMENT METHOD AND EGG SEARCH CODE MANAGEMENT SYSTEM

(75) Inventor: Shigehisa Omatsu, Chiba (JP)

(73) Assignee: Consumers Co-Operative Sapporo, Hokkaido (JP)

( * ) Notice: Subject to any disclaimer, the term of this patent is extended or adjusted under 35 U.S.C. 154(b) by 765 days.

(21) Appl. No.: 12/085,953

(22) PCT Filed: Dec. 7, 2006

(86) PCT No.: PCT/JP2006/324454
§ 371 (c)(1),
(2), (4) Date: Jun. 3, 2008

(87) PCT Pub. No.: WO2007/066724
PCT Pub. Date: Jun. 14, 2007

(65) Prior Publication Data
US 2009/0078213 A1    Mar. 26, 2009

(30) Foreign Application Priority Data
Dec. 7, 2005   (JP) ................. 2005-353833

(51) Int. Cl.
*G06Q 10/00* (2006.01)
*G06F 17/28* (2006.01)
(52) U.S. Cl. ........................ 705/28; 715/500
(58) Field of Classification Search ............. 705/28; 715/500
See application file for complete search history.

(56) References Cited

U.S. PATENT DOCUMENTS
5,478,990 A * 12/1995 Montanari et al. ........... 235/375
(Continued)

FOREIGN PATENT DOCUMENTS
JP    2004344040 A   * 12/2004
(Continued)

OTHER PUBLICATIONS

PCT International Search Report mailed on Feb. 13, 2007 for the corresponding International patent application No. PCT/JP2006/324454.

(Continued)

*Primary Examiner* — Elaine Gort
*Assistant Examiner* — Ashford S Hayles
(74) *Attorney, Agent, or Firm* — Posz Law Group, PLC (57) ABSTRACT

An egg search code, that can be used for accurately searching history information of an egg using a number of digits printable on the egg, is assigned to the egg, and the history information of the egg can be accurately identified based on the egg search code assigned to the egg. An unused egg search code out of the totality of egg search codes is determined and will be used as the egg search code to be assigned to the egg. The determined egg search code is assigned to all eggs having identical history information. The egg search code assigned to the egg is related to the egg history code and an egg collection date code, and is stored. The egg history code related to the egg collection date code and the egg search code is searched for, in compliance with a provision request, submitted from a consumer terminal, for history information, the provision request containing the egg collection date code and/or the egg search code. The history information identified by the searched egg history code is transmitted to the consumer terminal through a communication network.

14 Claims, 5 Drawing Sheets

100: EGG INFORMATION MANAGEMENT SYSTEM

U.S. PATENT DOCUMENTS

| | | | |
|---|---|---|---|
| 7,062,513 B2* | 6/2006 | Beck et al. | 1/1 |
| 7,085,777 B2* | 8/2006 | Beck et al. | 1/1 |
| 7,412,461 B2* | 8/2008 | Sholl et al. | 1/1 |
| 7,440,901 B1* | 10/2008 | Dlott et al. | 705/346 |
| 7,657,740 B2* | 2/2010 | Numao et al. | 713/159 |
| 2003/0004750 A1* | 1/2003 | Teraoka et al. | 705/1 |
| 2003/0006281 A1* | 1/2003 | Thomas et al. | 235/385 |
| 2004/0054506 A1* | 3/2004 | Singh et al. | 702/188 |
| 2004/0172587 A1* | 9/2004 | Lawlor | 715/500 |
| 2004/0203377 A1* | 10/2004 | Eaton et al. | 455/41.2 |
| 2004/0220855 A1* | 11/2004 | Carignan et al. | 705/14 |
| 2005/0067106 A1* | 3/2005 | Melges | 156/367 |
| 2005/0131723 A1* | 6/2005 | Sholl et al. | 705/1 |
| 2005/0131763 A1* | 6/2005 | Junger | 705/23 |
| 2005/0226975 A1* | 10/2005 | Drouillard | 426/383 |
| 2005/0261991 A1* | 11/2005 | Kennamer | 705/28 |
| 2005/0267790 A1* | 12/2005 | Skalsky | 705/7 |
| 2005/0273369 A1* | 12/2005 | Ota et al. | 705/4 |
| 2006/0004702 A1* | 1/2006 | St. John et al. | 707/2 |
| 2006/0059137 A1* | 3/2006 | Walker | 707/3 |
| 2006/0138105 A1* | 6/2006 | Parker | 219/121.69 |
| 2006/0265584 A1* | 11/2006 | Bourret et al. | 713/150 |
| 2006/0271555 A1* | 11/2006 | Beck et al. | 707/10 |
| 2007/0067177 A1* | 3/2007 | Martin et al. | 705/1 |
| 2007/0088634 A1* | 4/2007 | Matsumoto et al. | 705/28 |
| 2007/0095905 A1* | 5/2007 | Kadaba | 235/384 |
| 2007/0221727 A1* | 9/2007 | Reznik | 235/383 |
| 2007/0292559 A1* | 12/2007 | Garwood | 426/2 |
| 2008/0086321 A1* | 4/2008 | Walton | 705/1 |
| 2008/0245859 A1* | 10/2008 | Saito et al. | 235/380 |
| 2009/0222285 A1* | 9/2009 | Silverbrook et al. | 705/2 |
| 2009/0234756 A1* | 9/2009 | Omatsu | 705/28 |
| 2010/0145730 A1* | 6/2010 | Abreu | 705/3 |

FOREIGN PATENT DOCUMENTS

| | | |
|---|---|---|
| JP | A-2004-342097 | 12/2004 |
| JP | A-2004-344040 | 12/2004 |
| JP | 2006018420 A * | 1/2006 |

OTHER PUBLICATIONS

Material Flow, Jan. 2005, vol. 46, pp. 88-93.

Office Action issued on Jul. 5, 2011 in the corresponding Japanese patent application No. 2005-353833.

Office Action mailed on Feb. 22, 2011 from the Korean Patent Office about the corresponding patent application No. 10-2008-7011284 (A original Korean Office Action, Japanese translation and English partial translation).

* cited by examiner

FIG. 1

100: EGG INFORMATION MANAGEMENT SYSTEM

FIG. 2

EGG MASTER CODE

| EGG COLLECTION DATA CODE (5 digits) | INDIVIDUAL PRODUCT CODE (16 digits) ||
|---|---|---|
| | EGG SEARCH CODE (5 digits) | EGG HISTORY CODE (11 digits) |
| 51205 | 00001 | 12345678901 |
| 51205 | 00002 | 12312378456 |
| 51205 | ⋮ | ⋮ |
| 51205 | 23456 | 12678989021 |
| 51206 | 00001 | 12346543210 |
| 51206 | 00002 | 34523543210 |
| 51206 | ⋮ | ⋮ |

EGG CODE MANAGEMENT METHOD AND EGG SEARCH CODE MANAGEMENT SYSTEM

CROSS REFERENCE TO RELATED APPLICATIONS

The present application is a PCT National Stage of PCT Application No. PCT/JP2006/324454, filed on Dec. 7, 2006, and claims priority to and incorporates by reference Japanese Patent Application No. 2005-353833, filed on Dec. 7, 2005.

BACKGROUND

Exemplary embodiments of the present invention relate to an egg search code management method and an egg search code management system that assign an egg search code to an egg that is used to identify history information of the egg, and manage the assigned egg search code, in order to provide the history information of the egg in a traceability system.

Recently, traceability systems that provide a production and distribution history of eggs to a consumer who purchased the eggs are being implemented through a communication network such as the Internet.

In these traceability systems, the production and distribution history of an egg can be searched and browsed by making a code (the egg search code), to be used as a search key, that is printed on a container, such as a pack, in which the egg is contained.

A related example of a prior art traceability system that prints an egg search code on a container in which eggs are contained and provides the production and distribution history of the pertinent egg, based on the printed egg search code, is patent document 1: Japanese Patent Application Publication No. 2004-344040.

In the conventional system described in patent document 1, mentioned above, it is impossible to print an entire egg search code on an egg since the content of the egg search code is determined according to predetermined information, and the number of digits of the egg search code can be very large. That is to say, the problem is that not all of the egg search code can be printed on the egg, when the number of code digits is large, since the printable area is limited when the code is printed directly on the egg.

Meanwhile, although it is possible to print a part of the egg search code on the egg, it is difficult to search the history information accurately based on such a partial egg search code.

SUMMARY

It is an object of exemplary embodiments of the present invention to resolve the problem described above, by assigning an egg search code to an egg that accurately identifies the history information of the egg, and can be searched accurately, with all of the digits being printable on the egg.

An exemplary egg search code management method assigns an egg search code to an egg so as to identify history information of the egg and manages the assigned egg search code in order to provide the history information of the egg in a traceability system. The egg search code management method is characterized by determining unused egg search codes, out of all the available egg search codes related to history identification codes, to assign to eggs (for example, a step S102), assigning the determined egg search codes to the eggs that have identical history information (for example, a step S106), relating the egg search code assigned to the egg to the history identification code and an egg collection date code that can identify the egg collection date, storing the egg search codes assigned to the egg (for example, storing as an egg master code shown in FIG. 2), searching for the history identification code related to the egg collection date related code and the egg search code, in compliance with a provision request, submitted from a consumer terminal (for example a consumer terminal 70), for history information, the provision request containing the egg collection date related code that can identify the egg collection date code and/or the egg search code, and transmitting the history information identified by the searched history identification code to the terminal apparatus through a communication network.

Using the method mentioned above, it is possible to assign an egg search code to an egg by which the history information of the egg can be searched accurately using the number of digits assignable to eggs, and accurately identify the history information of the egg based on the egg search code assigned to the egg.

It is desirable that the lower digits of the egg search code are related to the history identification code as well as the upper digits of such egg search code are related to the egg collection date code. In order to comply with a provision request for history information, from a terminal apparatus, the egg search code that is related to the lower digits of the egg collection date code, that is, the history identification code related to the history request information is searched. By configuring the system in this manner, history information can be easily identified based on the egg search code.

The egg collection date related code is defined to be a code that is related uniquely to the egg collection date code, a use-by date code that indicates a use-by date, or a sell-by date code that indicates a sell-by date, or to the egg search code.

An exemplary egg search code management system includes an egg search code management server that issues the egg search code related to the history identification code to identify a history information of each egg, and manages the issued egg search code, an egg search code assigning apparatus that assigns an egg search code to an egg and an apparatus management server that performs an issue request of the egg search code to the egg search code management server and notifies the egg search code assigning apparatus of the egg search code issued by the egg search code management server as the egg search code to assign to the egg.

The egg search code management system is characterized by the fact that the egg search code management server includes an egg search code issuer that issues any of unused egg search code out of all possible egg search codes as the egg search code to assign to the egg complying with the issue request from the apparatus management server and by a code storer that relates the egg search code issued by the egg search code issuer to the history identification code and the egg collection date code that can identify the egg collection date and stores the egg search code, and by the fact that the egg search code assigning apparatus includes an egg search code assigner that assigns the egg search code issued by the egg search code issuer to the eggs that have the identical history information, and by the egg search code management server, complying with the provision request for the history information, submitted from a terminal apparatus with the egg collection date related code that can identify the egg collection date code and/or the egg search code, searches the history identification code related to the egg collection date code identified by the egg collection date related code and the egg search code and transmits the history information identified by the searched history identification code to the terminal apparatus through a communication network.

In exemplary embodiments of the present invention, an egg search code that can be used to accurately search a history information of an egg with a number of digits printable on the egg can be assigned to the egg, and it is possible to accurately identify the history information of the egg based on the egg search code assigned to the egg.

DETAILED DESCRIPTION

Hereinafter, exemplary embodiments will be described with reference to the drawings.

Figure 1:
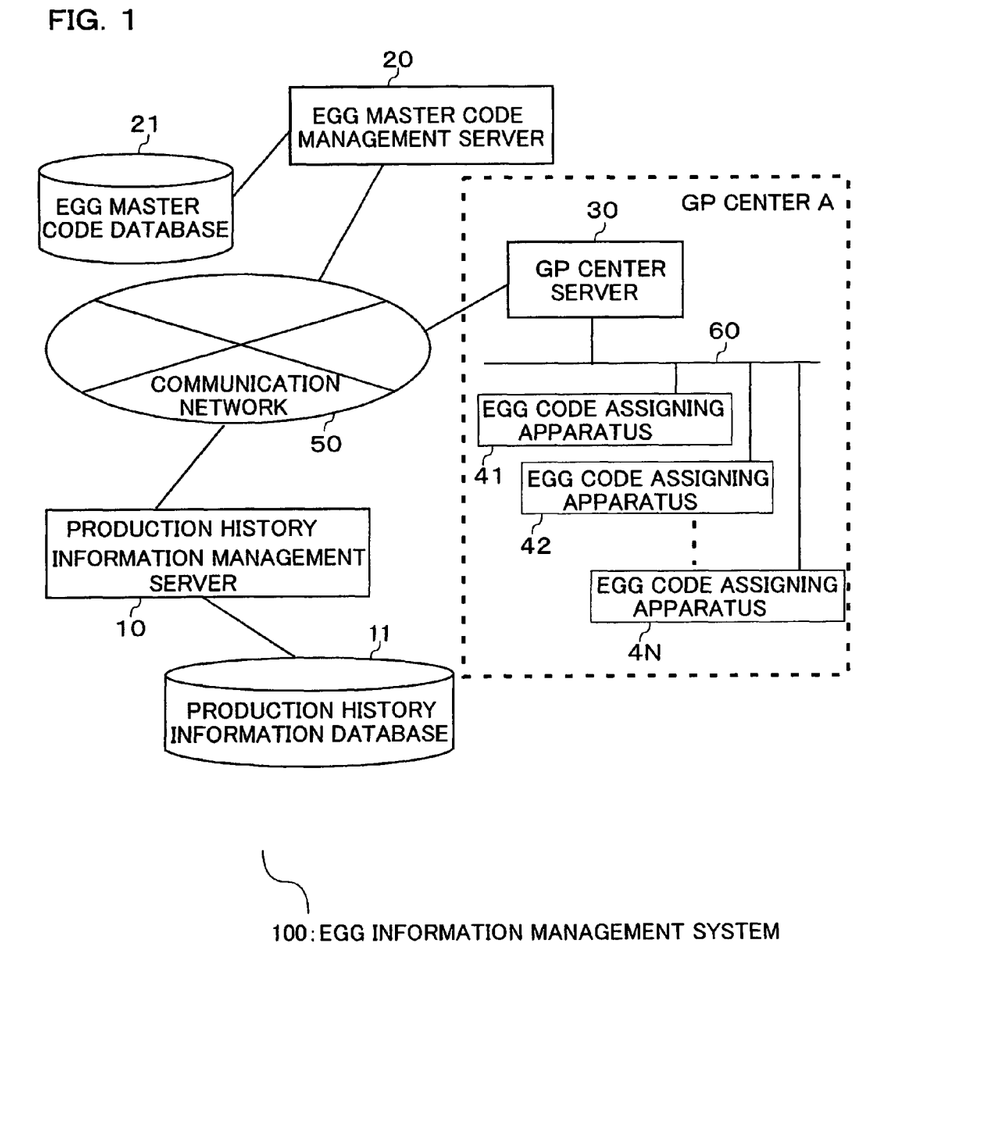
FIG. 1 is a block diagram that illustrates a configuration of an egg information management system.

FIG. 1 is a block diagram that illustrates a configuration of an egg information management system 100. As shown in FIG. 1, the egg information management system 100 includes a production history information management server 10, an egg master code management server 20, a GP center server 30, and egg code assigning apparatuses 41 to 4N (N: arbitrary positive integer).

The production history information management server 10, the egg master code management server 20, and the GP center server 30 are respectively connected to a communication network 50 such as the Internet. Also, the GP center server 30 and the egg code assigning apparatuses 41 to 4N are respectively connected to a communication network 60 such as a LAN arranged in a GP center A, for example.

In this regard, although FIG. 1 shows the GP center server 30 and the egg code assigning apparatuses 41 to 4N placed in the GP center A, a GP center server and egg code assigning apparatuses placed in another GP center can also be included in the egg information management system 100.

Each of the production information management server 10, the egg master code management server 20, and the GP center server 30 are configured to be an information processing apparatus such as a web server.

The production history information management server 10 is a server that is managed by a system manager of the traceability system including part or all of the egg information management system 100, for example, and performs various kinds of processing such as management and provision processing of the production history information that is provided in the traceability system. The production history information management server 10 includes a production history information database 11 in which the production history information including at least the production history information of the egg is stored. In the production history information database 11, the production information registered by a producer using a communication terminal apparatus such as a handheld communication terminal is stored as the production history information.

The "production history information" is various kinds of information related to production of eggs in the present embodiment, and includes information such as a poultry house name (a chicken farm name), a location of the poultry house (a location of the chicken farm), a poultry house manager's name (a chicken farm manager's name), the egg collection date, a brand of eggs, a size of eggs, a ship date, a ship to GP center name and so on. In this regard, the production history information database 11 can be placed either inside or outside the production history information management server 10.

The egg master code management server 20 is a server that is managed by the system manager of the egg information management system 100, for example, and performs various kinds of processing such as a process of issuing individual product codes and management of an egg master code, which includes the issued individual product codes. The egg master code management server 20 includes an egg master code database 21 in which the egg master code, etc. are stored. In the egg master code database 21, the egg master code including the individual product codes issued by the egg master code management server 20, for example, are stored. The details of "egg master code" and "individual product code" are described later. In this regard, the egg master code database 21 can be placed either inside or outside the egg master code management server 20.

The GP center server 30 is managed by a GP center manager that manages the GP center A, for example, and exchanges information with the production history information management server 10, the egg master code management server 20, etc. through the communication network 50 as well as exchanging information with each of the egg code assigning apparatuses 41 to 4N through the communication network 60.

Each of the egg code assigning apparatuses 41 to 4N perform various kinds of processing such as a processing of assigning (printing) an egg search code to an egg and processing the packing of the egg into a package for eggs. In this regard, since each of the egg code assigning apparatuses 41 to 4N are configured identically, the egg code assigning apparatus 41 is mainly described in the following description.

Figure 2:
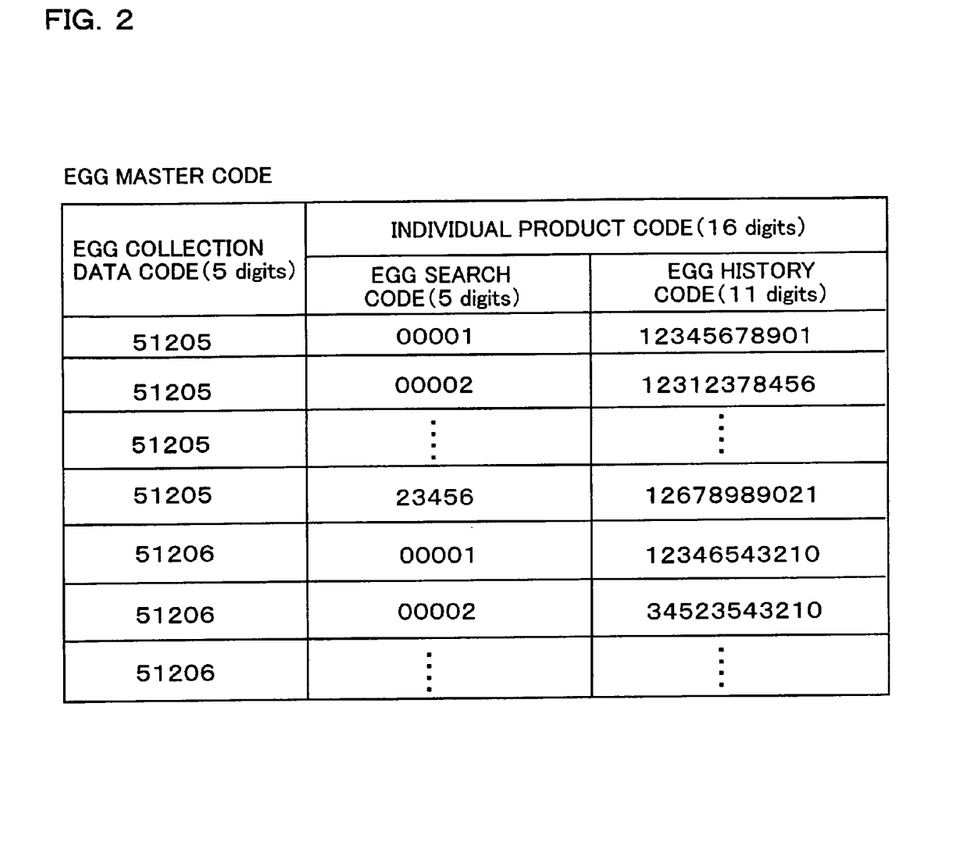
FIG. 2 is an explanatory drawing that illustrates an egg master code.

FIG. 2 is an explanatory drawing that illustrates the egg master code that is stored in the egg master code database 21. As shown in FIG. 2, the egg master code is configured to include the egg collection date code by which the egg collection date can be identified and the individual product code that is assigned to part or all of the eggs that have identical production and distribution history. In the present embodiment, the egg master code is configured to be a code that the five upper digits are matched to the egg collection date code and the lower sixteen digits are matched to the individual product code. In this regard, in alternative embodiments, the number of digits of the egg collection date code and the individual product code can be another number of digits.

The individual product code is a code that can identify the production and distribution information of the egg, and is comprised of the egg search code assigned to the egg as a search key in the traceability system and an egg history code to identify the history information of the egg. In the present embodiment, it is defined that the upper five digits indicate the egg search code and the lower eleven digits indicate the egg history code. In this regard, in alternative embodiments, the number of digits of the egg search code and the egg history code can be another number of digits.

In the present embodiment, the egg search code is a five digit number from "00000" to "99999", and when a number of eggs can be identified to have identical history, the eggs are assigned with an identical number.

The egg history code includes production information, except the egg collection date of the egg, and distribution information of the egg. The distribution information includes various kinds of information relating to egg distribution, including for example, a goods receipt date at a GP center, a ship-to dealer, a ship date to the ship-to dealer, a use-by date, and a sell-by date.

Next, operation of the egg information management system 100 of the present embodiment is described. The process of assigning an egg search code to an egg, received at the GP center A from the egg code assigning apparatus 41 and so on, is also described. In order to simplify the explanation, the case where an egg search code is assigned to a predetermined number of eggs, having an identical production and distribution history, is given as an example.

Figure 3:
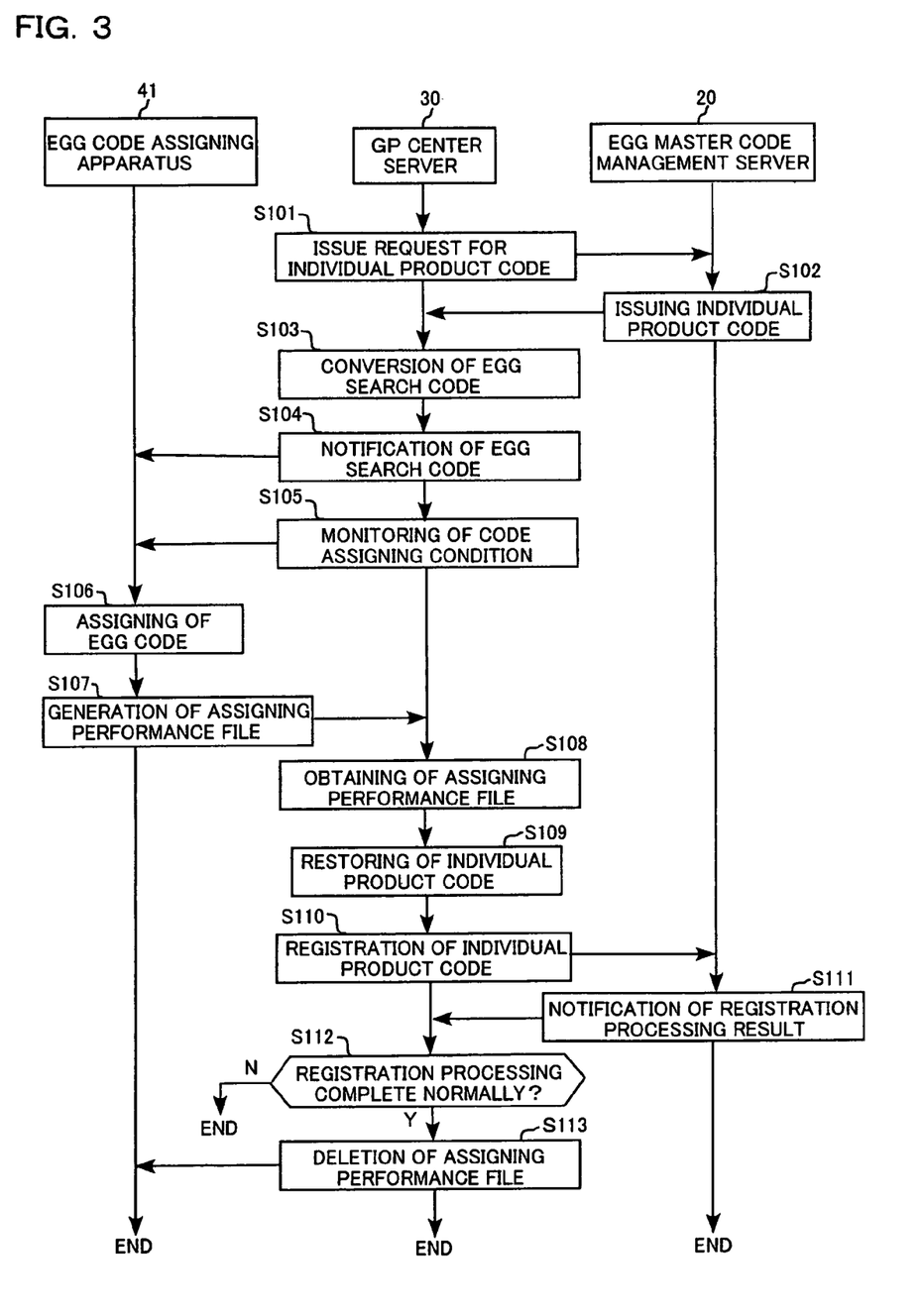
FIG. 3 is a flowchart that illustrates a processing of code assigning.

FIG. 3 is a flowchart that illustrates a processing of code assignment in the egg information management system 100 of the present embodiment. In the processing of code assignment, the GP center server 30 first reads the production information attached on the case that contains the egg received at the GP center A, and then submits an individual product code issuing request, which includes the previously read production information, to the egg master code management server 20 (step S101.)

In the present embodiment, the eggs contained in the same case are regarded as having identical production and distribution information. When eggs having identical production and distribution information are contained in a plurality of cases, the system is configured either to read the production information attached on one of the plurality of cases and assign all the eggs contained in the plurality of cases with the identical egg search code, or to read the production information for each case and assign different egg search codes for each case.

The individual product code issuing request includes the production information and predetermined distribution information (for example an installation date and hour to the GP center A, and an apparatus number of the egg code assigning apparatus to be used.)

Receiving the individual product code issuing request, the egg master code management server 20 issues the individual product code based on information contained in the received individual product code issuing request, and transmits the issued individual product code to the GP center server 30 through the communication network 50 (step S102.)

At step S102, the egg master code management server 20 generates the egg history code based on the received individual product code in the issuing request, and determines the egg search code and issues the individual product code, in which the determined egg search code is added in the upper digits of the generated egg history code.

The egg search code is determined by selecting an unused code out of the five digit codes ("00000" to "99999") in the present embodiment. One example of how egg search codes are determined is selecting sequentially as "00000", "00001", a code that is "one" greater than the code issued before it. Issued code information that indicates that an egg search code has been issued is stored in an egg master code database included in the egg master code management server 20.

In this regard, the issued code information is deleted at predetermined periods such as every day, every week, every month, etc. An issuing period of the issued code information is defined to be enough time such that not all of the five digit egg search codes will be issued. In particular, when it takes at least thirty five days by the time that all of the egg search codes are issued, the issued code information can be deleted every month. In this regard, since it may not be able to search accurately by updating per several hours that is less than a day, it is good to increase the number of digits of the codes and make it no need to update per several hours less than a day in that case.

Receiving the issued individual product code, the GP center server 30 converts the received individual product code into the egg search code (step S103). That is, it is converted to the egg search code by extracting the upper five digits of the sixteen digit individual product code.

After that, the GP center server 30 notifies and provides the egg search code to the egg code assigning apparatus 41 (step S104.) And it starts a processing of monitoring an assigning condition of the egg search code (step S105.) In particular, it monitors whether an assigning performance file relating to the egg search code is generated at the egg code assigning apparatus 41.

Receiving a notification of the egg search code, the egg code assigning apparatus 41 performs a processing of assigning the notified egg search code to each of the eggs as well as that of counting the number of the eggs assigned the egg search code (step S106.) Also, the egg code assigning apparatus 41 performs a processing of packing the eggs into a package per predetermined number, such as per six, per ten, etc. The assigning of the egg search code to the egg is performed by printing it on an eggshell in the present embodiment. In this regard, it can either be assigned to a sticker attached to the egg or the package of the egg, or printed on the package of the egg. Also, at the step S106, the counted number as the number of eggs assigned the egg search code can be added to the individual product code successively.

Figure 4:
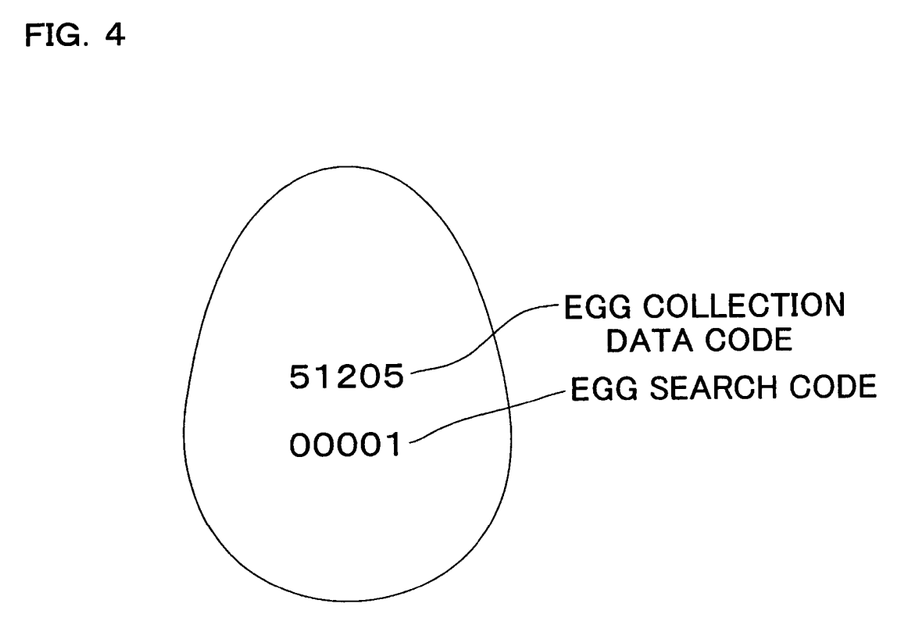
FIG. 4 is an explanatory drawing that illustrates an example of a printed condition of an egg search code and an egg collection date code on an egg.

Also, the egg code assigning apparatus 41 assigns the egg collection date code that indicates the egg collection date to any of the egg, the package in which the egg is contained, the sticker attached to the package, or a point-of-purchase display. FIG. 4 illustrates a condition that the egg search code and the egg collection date code are printed on the egg. As shown in FIG. 4, the printing onto the egg is written in a double line, for example the egg collection date code is printed on the upper line and the egg search code is printed on the lower line. In this regard, the printing format shown in FIG. 4 is only an example, and it can in other formats in alternative embodiments.

When a series of processing such as assigning of the egg search code for a plurality of eggs contained in the case is completed, the egg code assigning apparatus 41 generates the assigning performance file relating to the egg search codes assigned, and resisters it in a storage medium included in itself (step S107.) The assigning performance file includes the information such as the assigned egg search code, the number of eggs to which the egg search code is assigned, etc.

The GP center server 30, after confirming the generation of the assigning performance file in the monitoring process started at the step S105, obtains the generated assigning performance file from the egg code assigning apparatus 41 (step S108), restores the individual product code (step S109), and registers the restored individual product code in the egg master code management server 20 (step S110.)

After registering the egg master code including the individual product code obtained from the GP center server 30 in the egg master code database 21, the egg master code management server 20 notifies the registration processing result (step S311.)

Upon receiving the registration processing result, if it is normally registered (step S112), the GP center server 30 deletes the assigning performance file registered in itself and the egg code assigning apparatus 41 (step S113). On the other hand, if it is not normally registered (step S112), the assigning performance file registered in the egg code assigning apparatus 41 is preserved without deleting.

In this manner, when it can not be confirmed that the individual product code including the assigned egg search code is normally registered in the egg master code database 21, included in the egg master code management server 20, the assigning performance file registered in the egg code assigning apparatus 41 is preserved without deleting. It is thus is possible to prevent the loss of the information relating to the assigned egg search code.

Next, it is described on a processing of history provision based on a history reference of a product in the traceability system.

Figure 5:
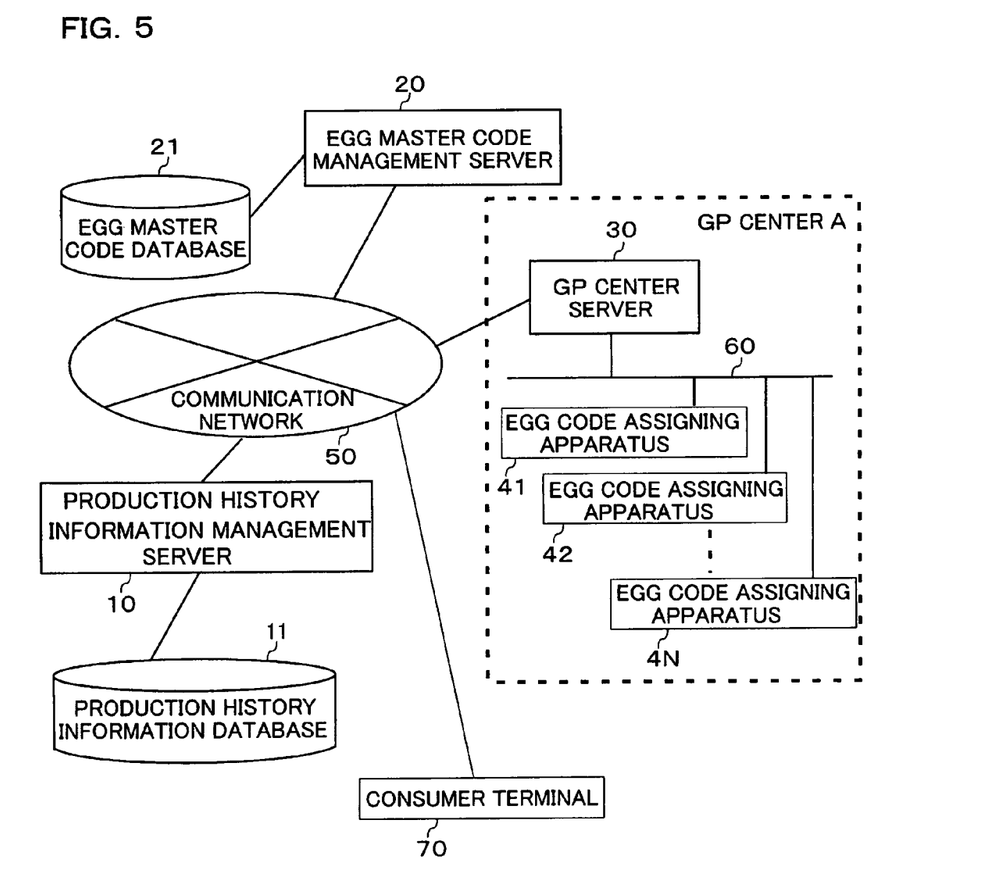
FIG. 5 is a block diagram that illustrates a history reference system including a consumer terminal used by a consumer that purchased an egg.

FIG. 5 is a block diagram that illustrates a history reference system including a consumer terminal 70 used by a consumer that purchased eggs. In this regard, in FIG. 5, the detailed description of the similar elements as the system 100 shown in FIG. 1 is omitted by assigning the same reference numerals.

The consumer terminal 70 is configured with an information processing apparatus, for example a personal computer and a handheld information terminal, and is equipped with software and hardware to connect to the communication network 50.

An example is now described where a consumer X who purchased an egg Y requests the history reference of egg Y by using the consumer terminal 70.

Firstly, the consumer terminal 70 accesses the egg master code management server 20, complying with an operation of the consumer X, and submits the egg collection date code assigned to egg Y, or the package that contains egg Y, and the egg search code assigned to egg Y. In this case, when the egg collection date code corresponds to a code that shows the newest date submitted automatically by a calendar function of the consumer terminal 70, only the egg search code may be submitted.

Upon receipt of the history reference request, along with the egg collection date code and the egg search code, the egg master code management server 20 refers to the egg master code stored in the egg master code database 21 included in itself, searches the egg master code using the submitted egg collection date code and the submitted egg search code, and identifies the history information of the egg Y based on the egg history code included in the searched egg master code.

In this regard, it is possible to store an application having an executive function of the history reference request in the consumer terminal 70 beforehand, and performs the history reference request using the egg search code digitalized by an OCR recognition device, for example, by using the application.

In the present embodiment, the egg master code management server 20 obtains the distribution information from the egg master code database 21 and obtains the production information from the production history information management server 10 based on the egg history code included in the searched egg master code.

And, the egg master code management server 20 provides part or all of the information that the obtained distribution information shows as part or all of the distribution history, and provides part or all of the obtained production information as part or all of the production history.

As described in the embodiment above, the egg information management system is configured to perform the following functions:

determine any of unused egg search codes out of all the available egg search codes used to identify the history information of each egg;

assign the determined egg search code to eggs having identical history information;

relate the egg search code assigned to the eggs to the egg history code and the egg collection date code;

store the egg search code;

search for the egg history code related to the egg collection date code and the egg search code, in compliance with a provision request, submitted from consumer terminal 70 and containing an egg collection date code and an egg search code, for history information; and transmit the history information identified by the searched egg history code to the consumer terminal 70 through the communication network 50.

This system makes it possible to assign an egg search code to an egg that can be used to accurately search the history information of the egg using the eggs search code assigned to the egg, and accurately identify the history information of the egg based on the egg search code assigned to the egg.

Also, in the embodiment described above, the egg master code has a code configuration in which the egg collection date code is related (or attached) to an upper side of the egg search code and the egg history code is related to a lower side of the egg search code. The egg search code management system is configured to search for the egg history code related to history information, in compliance with a provision request, submitted from the consumer terminal 70, for history information by presenting the history request information to the egg search code management system. In the history request information, the egg search code is attached to a lower side of the egg collection date code. The history information can be easily identified based on the egg search code.

That is, depending on whether a series of code consisting of the egg collection date code and the egg search code, which are the history request information from the consumer terminal 70, are included in the successive and predetermined digits of the egg master code, the egg master code including the egg history code can be easily searched for and the history information based on the egg search code can be easily identified.

In this regard, in the embodiment described above, although the system is configured to search using the egg collection date code, the egg collection date related code can additionally identify the use-by date code that indicates the use-by date, or the sell-by date code that indicates the sell-by date. Also, it can be replaced by a unique code on the egg search code that can identify the egg collection date. That is, it is possible to use a predetermined code related uniquely to each of the egg search code.

Although the embodiments described above relate to the assignment of egg search codes for searching for information related to eggs and the management of the egg search codes, it is possible to apply alternative embodiments to the assignment and management of codes for searching for information related to other food products such as vegetable and fruit.

What is claimed is:

1. A method for managing an egg search code that, in order to provide history information of an egg in a traceability system, assigns an egg search code to the egg so as to identify the history information of the egg and manages the assigned egg search code, the method performed using an egg search code management server, the method comprising:

determining, in an egg search code management server, any of unused egg search codes out of available egg search codes, related to a history identification code in order to identify the history information of each egg, as the egg search code to be assigned to the egg, assigning the determined egg search code to eggs each having identical history information;

relating the egg search code assigned to the eggs to the history identification code and an egg collection date code that can identify an egg collection date;

storing, by the egg search code management server, the egg search codes assigned to the eggs so as to relate the egg search codes to the history identification codes and an egg collection date code that can identify an egg collection date;

in compliance with a provision request for the history information of the egg from a terminal apparatus which presents history request information in which the egg search code is attached to a lower side of the egg collection date code, searching by the egg search code management server for the history identification code which is related to the lower side of the egg search code related to the egg collection date code identified by an egg collection date related code which is related to an upper side of the egg search code and the egg search code, the provision request being performed by presenting the egg collection date related code that can identify the egg collection date code and/or the egg search code; and transmitting, by the egg search code management server, the history information identified by using the searched history identification code to the terminal apparatus through a communication network.

2. The method for managing the egg search code according to claim 1, wherein the egg collection date related code is defined to be a code related uniquely to the egg collection date code.

3. An egg search code management system comprising:

an egg search code management server issuing an egg search code related to a history identification code to identify history information of each egg and managing the issued egg search code;

an egg search code assigning apparatus assigning an egg search code to each egg; and an apparatus management server performing an issue request for issuance of the egg search code to the egg search code management server and notifying the egg search code;

assigning apparatus that of the egg search code issued by the egg search code management server as the egg search code to be assigned to the egg, wherein the egg search code management server further comprises:

an egg search code issuer for issuing any of unused egg search codes out of available egg search codes as the egg search code to be assigned to the egg in compliance with the issue request from the apparatus management server; and a code storer for relating the egg search code issued by the egg search code issuer to the history identification code and an egg collection date code that can identify an egg collection date and for further storing the related code, wherein the egg search code assigning apparatus comprises:

an egg search code assigner for assigning the egg search code issued by the egg search code issuer to eggs each having identical history information, wherein the egg search code management server searches the history information of the egg from a terminal apparatus which presents history request information in which the egg search code is attached to a lower side of the egg collection date code, searching by the egg search code management server for the history identification code which is related to the lower side of the egg search code related to the egg collection date code identified by an egg collection date related code which is related to an upper side of the egg search code and the egg search code, the provision request being performed by presenting the egg collection date related code that can identify the egg collection date code and/or the egg search code; and transmitting, by the egg search code management server, the history information identified by using the searched history identification code to the terminal apparatus through a communication network.

4. The egg search code management system according to claim 3, wherein the egg collection date related code is a code related uniquely to the egg collection date code.

5. The method for managing the egg search code according to claim 1, wherein the number of digits of the egg search code is defined so that all of the egg search codes are not issued within a predetermined period.

6. The egg search code management system according to claim 3, wherein the number of digits of the egg search code is defined so that all of the egg search codes are not issued within a predetermined period.

7. The method for managing the egg search code according to claim 1, wherein the history information of each egg identified by using the searched history identification code includes a poultry house name, a poultry house location, a size of eggs, and a ship date of shipping the eggs.

8. The egg search code management system according to claim 3, wherein the history information of each egg identified by using the searched history identification code includes a poultry house name, a poultry house location, a size of eggs, and a ship date of shipping the eggs.

9. The method for managing the egg search code according to claim 1, wherein the egg collection date related code is defined to be a code related uniquely to a use-by date code indicating a use-by date.

10. The method for managing the egg search code according to claim 1, wherein the egg collection date related code is defined to be a code related uniquely to a sell-by date code indicating a sell-by date.

11. The method for managing the egg search code according to claim 1, wherein the egg collection date related code is defined to be a code related uniquely to the egg search code.

12. The egg search code management system according to claim 3, wherein the egg collection date related code is a code related uniquely to the use-by date code indicating the use-by date.

13. The egg search code management system according to claim 3, wherein the egg collection date related code is a code related uniquely to the sell-by date code indicating the sell-by date.

14. The egg search code management system according to claim 3, wherein the egg collection date related code is a code related uniquely to the egg search code.

* * * * *